United States Patent
Dholakia

(10) Patent No.: US 9,884,272 B1
(45) Date of Patent: Feb. 6, 2018

(54) METHOD AND APPARATUS FOR FILTERING STORMWATER

(71) Applicant: Jayant M. Dholakia, Chandler, AZ (US)

(72) Inventor: Jayant M. Dholakia, Chandler, AZ (US)

( * ) Notice: Subject to any disclaimer, the term of this patent is extended or adjusted under 35 U.S.C. 154(b) by 732 days.

(21) Appl. No.: 14/120,231

(22) Filed: May 12, 2014

(51) Int. Cl.
*B01D 24/20* (2006.01)
*C02F 1/00* (2006.01)
*C02F 103/00* (2006.01)

(52) U.S. Cl.
CPC ............ *B01D 24/20* (2013.01); *C02F 1/001* (2013.01); *C02F 2103/001* (2013.01); *C02F 2201/002* (2013.01)

(58) Field of Classification Search
None
See application file for complete search history.

(56) References Cited

U.S. PATENT DOCUMENTS

| | | | | |
|---|---|---|---|---|
| 406,189 | A | * | 7/1889 | Baker ............... B01D 24/22 210/263 |
| 631,128 | A | * | 8/1899 | Ricketts ........... B01D 35/005 210/434 |
| 3,044,628 | A | * | 7/1962 | Heijnis ............... B01D 46/30 210/290 |
| 3,146,189 | A | * | 8/1964 | Dick .................. B01D 46/30 208/146 |
| 3,875,055 | A | | 4/1975 | Grosboll |
| 3,876,546 | A | | 4/1975 | Hsiung |
| 3,960,508 | A | * | 6/1976 | Bessant ............... B01D 46/24 208/146 |
| 4,235,724 | A | | 11/1980 | Ginaven |
| 4,904,456 | A | * | 2/1990 | Anderson ............ B01J 8/0453 210/282 |
| 5,024,771 | A | | 6/1991 | Chiarito |
| 5,281,332 | A | | 1/1994 | Vandervelde |
| 5,474,586 | A | | 12/1995 | Eaton |
| 5,492,635 | A | | 2/1996 | Ball |
| 5,707,527 | A | | 1/1998 | Knutsen |
| 6,337,025 | B1 | * | 1/2002 | Clemenson ......... B01J 20/22 210/163 |
| 6,533,941 | B2 | | 3/2003 | Butler |
| 6,649,048 | B2 | | 11/2003 | de Ridder |
| 7,045,067 | B2 | | 5/2006 | Brown |
| 7,163,630 | B2 | | 1/2007 | Chilcote |
| 7,419,591 | B2 | | 9/2008 | Aberle |

\* cited by examiner

*Primary Examiner* — Benjamin M Kurtz

(57) ABSTRACT

A device and method for increasing the area available for passing contaminated stormwater through a granular media. The device comprises of one or more hollow elements that are made of degradable material and are of predetermined size and shape. The increased area available for flow is obtained by introducing a first media into predetermined areas of the device, introducing a second media into predetermined areas that are adjacent to areas containing the first media, and allowing the elements to degrade to bring about contact between the first and second media.

17 Claims, 6 Drawing Sheets

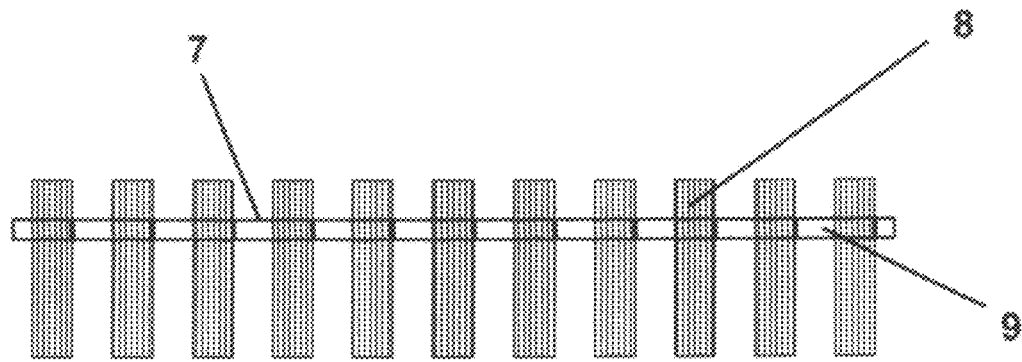
Fig. 1-A
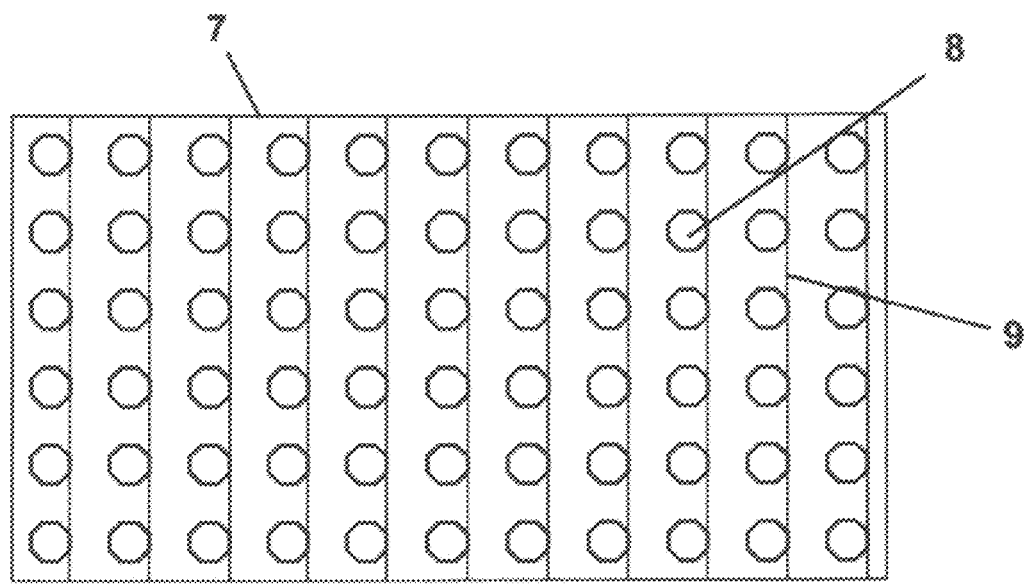
Fig. 1-B

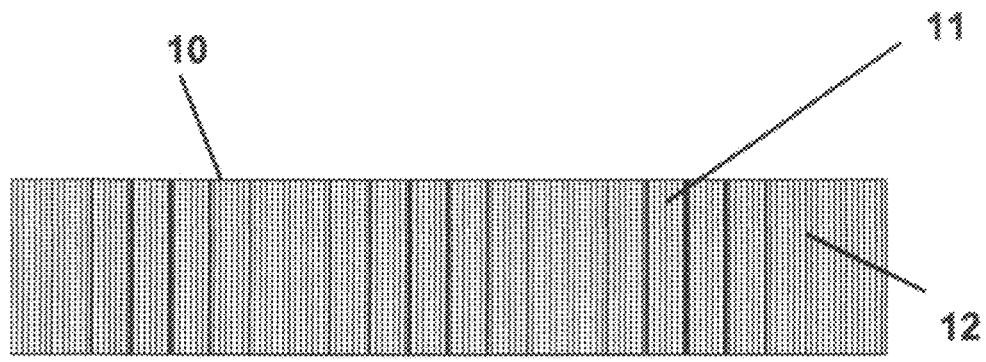
Fig. 2-A
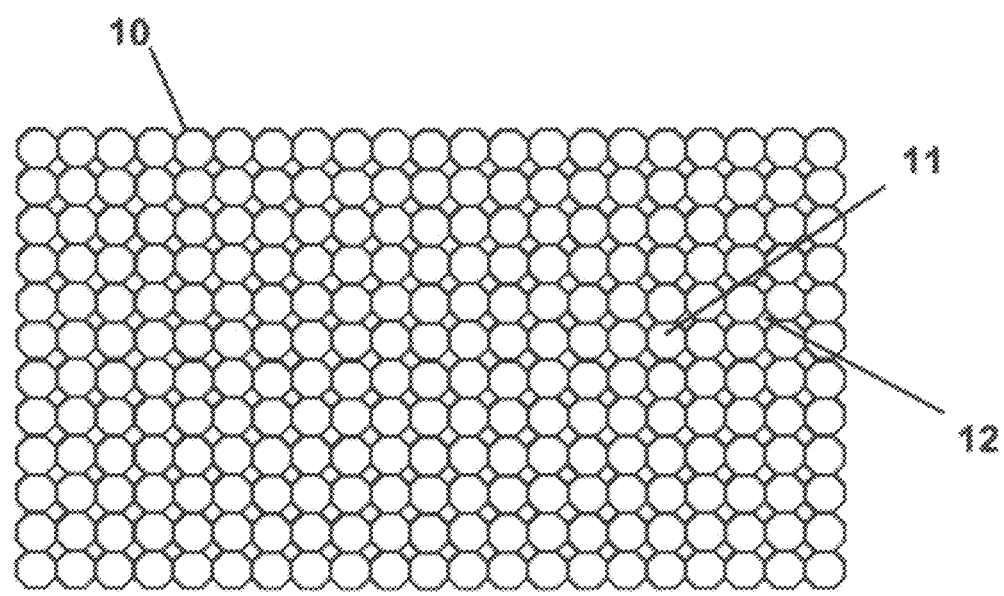
Fig. 2-B

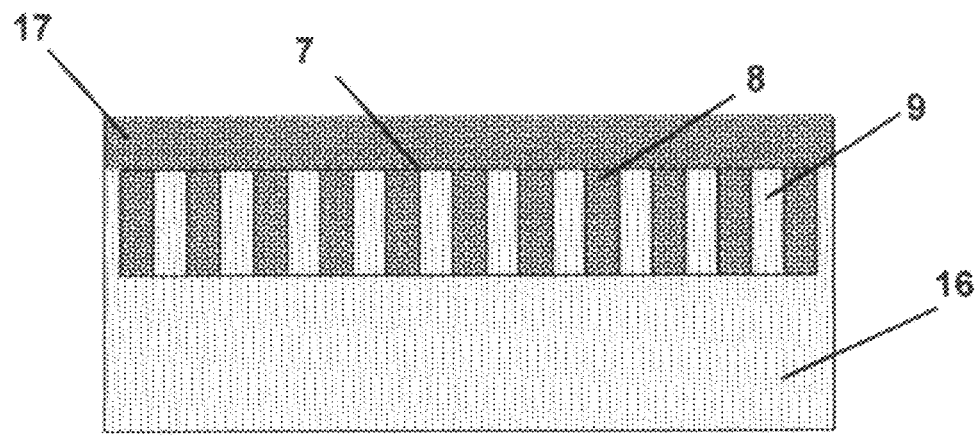
Fig. 4-A
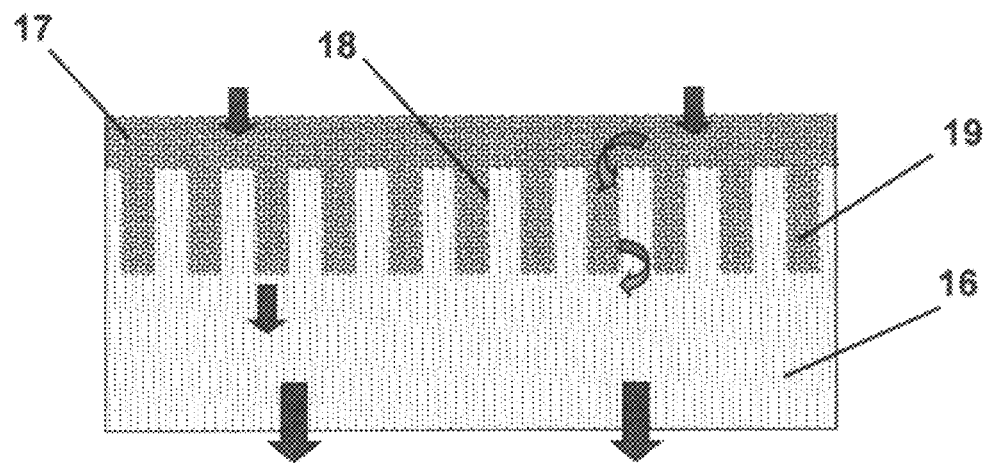
Fig. 4-B

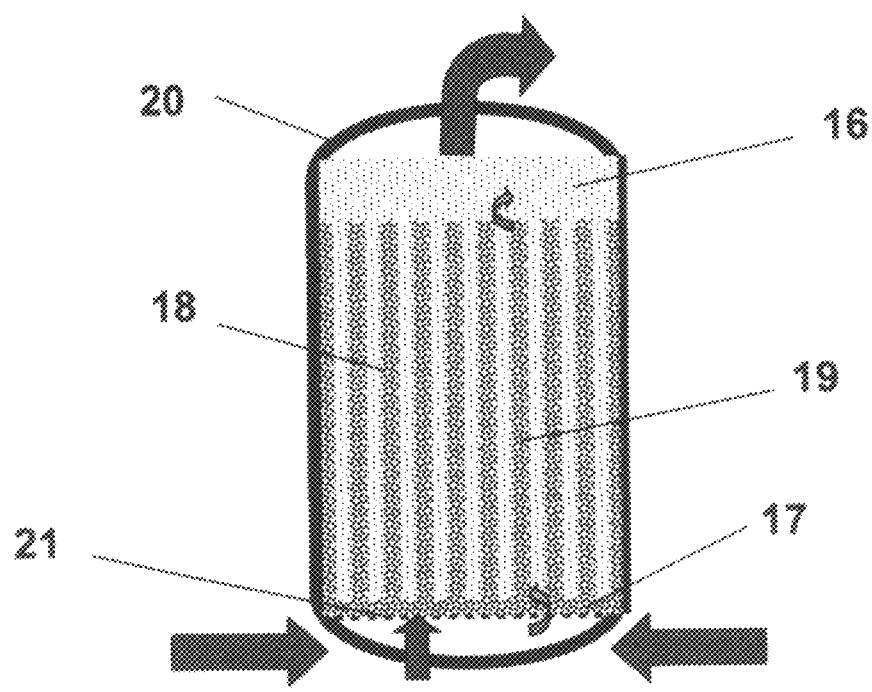

METHOD AND APPARATUS FOR FILTERING STORMWATER

CROSS-REFERENCE TO RELATED APPLICATIONS

This application is related to patent application 13/373,566.

FEDERALLY SPONSORED RESEARCH

Not Applicable

SEQUENCE LISTING OR PROGRAM

Not Applicable

BACKGROUND

Field of Invention

The present application relates to the removal of contaminants from stormwater.

Prior Art

The 1972 Clean Water Act (CWA), amended in 1987 to include stormwater discharges, has been the basis of increasing regulatory controls of both point and nonpoint source pollution. The CWA requires stormwater discharges to be regulated through Pollutant Discharge Elimination System (NPDES) permits. As part of these stormwater permits, facilities are often required to implement pollution prevention plans, which identify potential sources of pollution and describe and ensure the implementation of practices that reduce the pollutants in stormwater discharges. These practices are referred to as best management practices (BMPs). Best management practices that provide treatment of stormwater runoff include those that utilize filtration or infiltration. Relatively low loading rate practices such as sand filters and infiltration systems have proven effective in removing pollutants from storm water runoff. For relatively higher loading rate applications, for example at sites where space is constrained, there is a large number of proprietary "ultra-urban" canister or cartridge based filter systems available which comprise of individual canisters or cartridges. Infiltration systems (basins and trenches) are practices in which stormwater runoff is stored in the basin or in a trench, in voids between the stones or in the high void storage structures, and slowly infiltrates into the soil matrix below.

One of the most significant drawbacks to filtration and infiltration systems is premature clogging of the surface due to buildup of solids. In industrial and drinking water treatment, filters are backwashed periodically to restore hydraulic flow, or other mechanical methods may be used (U.S. Pat. No. 7,163,630). This is not possible in typical stormwater filtration devices which operate passively (without power) under gravity filtration. Many stormwater devices are therefore part of systems that incorporate some combination of filter media, hydrodynamic sediment removal, oil and grease removal, or screening to remove floatables and particles that could prematurely blind the filter media. A typical sand filter system includes a pretreatment or sedimentation chamber that prolongs filter media life by removing floatables and heavier suspended solids. Infiltration systems are normally combined with pretreatment such as grass strips or swales, or sediment basins to prevent premature clogging. Dual layer filters in which a coarse grain size media layer is on top of a finer grain size layer is another technique used to prolong the hydraulic life of filters (U.S. Pat. Nos. 7,045,067; 5,281,332; 3,876,546). Ultra-urban filter devices incorporate vertical flows or use relatively coarser media or media in pellet form to prevent premature clogging of the media (U.S. Pat. Nos. 7,419,591; 6,649,048; 5,707,527). In general, the trade off is between using small grain size filter media which improves treatment but results in quicker clogging, and using coarser grain size media which provides poorer treatment but prolongs hydraulic capacity.

In industrial applications, high contact area filter elements are used together with backwashing to prolong the service life of pressurized filtration systems. These elements, called "filter candles", are typically tubular or cylindrical and consist of slotted or perforated material, such as wire mesh or wedge wire, of various slot or opening sizes to suit the application (U.S. Pat. No. 5,474,586). Increasing the filtration contact area using a removable device has also been proposed for molten polymer filtration (U.S. Pat. No. 3,044,628). Filter candles have recently been proposed in wastewater and stormwater treatment applications (U.S. Pat. Nos. 3,875,055, 4,235,724; 5,492,635; 6,337,025; 6,533,941). Cartridge type filter devices used to treat environmental flows, including stormwater runoff, can also utilize screens both to filter particulates and as a means of directing flows in and out of the individual cartridges (U.S. Pat. Nos. 6,649,048; 5,024,771).

It is established that screen filtration elements are constructed of strong, durable materials such as metals (e.g., stainless steel, aluminum) or thermoplastic polymers (e.g., polypropylene, nylon). These materials, herein referred to as "conventional materials", do not undergo significant degradation when exposed to an environment (e.g., microorganisms, light, heat, stress, hydrolysis, oxidation) over tens, hundreds, or more years. Degradable materials, such as degradable polymers or polymer composites, are never used for screen material because their degradation results in relatively low strength and durability. The term "degradable material" is used herein to represent a material for which the time span for degradation is substantially shorter than that for conventional materials. Degradation is defined herein as a process of change in the structure of a material resulting in a significant loss of properties (e.g., integrity, weight, structure, mechanical strength, substance) and/or fragmentation into smaller pieces when exposed to an environment (e.g., microorganisms, light, heat, stress, hydrolysis, oxidation). Generally, the time span for degradation for objects made from degradable materials is substantially shorter than the time span required for degradation of objects made from conventional materials having the same dimensions.

Degradable materials can degrade by any number of processes, including, but not limited to, biodegradation, photodegradation, hydrolytic degradation, thermal degradation, oxidative degradation, mechanical degradation, or any combination of these. A biodegradable material, such as a biodegradable polymer or polymer composite, is a material that degrades owing to the action of micro- and/or macro-organisms or enzymes. The rate of biodegradation can vary depending on the nature of the functional group and degree of complexity. Biodegradation processes can occur in a number of ways, including, but not limited to, processes that result in mechanical damage, direct enzymatic effects leading to breakdown of the material structure, and secondary biochemical effects caused by excretion of substances that can directly affect the material or change environmental conditions, such as pH or redox conditions. Microorganisms produce enzymes that catalyze reactions by combining with a specific substrate or combination of substrates. A photodegradable material, including a photodegradable polymer, is a material in which the degradation results from the action of light such as daylight or sunlight. A hydrolytically degradable material, including a hydrolytically degradable polymer, is a material in which the degradation results from hydrolysis. A thermally degradable material, including a thermally degradable polymer, is a material which degrades when heated or when exposed to relatively high temperatures. An oxidatively degradable material, including an oxidatively degradable or oxo-biodegradable polymer, is a material in which the degradation results from oxidation. A mechanically degradable material is one that breaks down relatively easily when force is applied.

It will be understood by those skilled in the art that there are a large and growing number of materials that are degradable materials or can be used as additive, fillers, binders or catalysts to produce degradable materials. Degradable materials can be natural materials, synthetic materials, or a combination of the two, and include, but are not limited to, proteins (e.g., wheat, soy, zein), polysaccharides (e.g., chitin, cellulose, starch, dextran, xanthan, pectin, alginate), and polymers (e.g., degradable polyesters, degradable PP, PGA, PLA, PHA, PHB, PCL, PVOH, EVOH, PBS/PBSA polyesters, PEF, biodegradable PET, copolyesters, polyvinyl alcohol, polyamides, Biomax®, Biopol®, polyurethanes, polyolefins, modified PET, degradable polypropylene), as well as blends of these and other materials. Increasingly, additives are added to conventional polymers and degradable polymers to impart controlled degradation behavior (e.g., catalytic transition metal compounds such as cobalt stearate or manganese stearate).

Degradable materials can undergo degradation when they are buried in soil or other granular media and exposed to the surrounding environment. Degradation can also be induced or the rate of degradation can be increased by manually inducing the degradation. The term "manually inducing" means manipulating the surrounding environment in order to bring about the desired degradation. An example of manually inducing degradation is introducing water into the media to bring about degradation of hydrolytically degradable material. Another example is to provide heat to bring about degradation of thermally degradable material. It will be understood by those skilled in the art that manually induced degradation may be desirable because it allows greater control over the rate of degradation. The rate and manner of degradation of a material is affected by a number of factors, including, but not limited to, temperature, availability of oxygen or lack of it, burial and depth of burial of the product, humidity or wetness, rainfall, size, weight, surface area of product, polymer composition, including polymer type, molecular weight, crystallinity, orientation, surface-to-volume ratio, pH, and environment in which the product rests.

Degradation rates can be measured using a variety of short- or long-term tests including, but not limited to, environmental chamber tests in which the temperature and humidity of the environment can be manipulated, water tests, microbiologically active tests (such as the aerobic and anaerobic tests recommended by ASTM), and composting tests that simulate soil degradation. It will be understood by those skilled in the art that there are a wide variety of United States and International tests available, such as ASTM and ISO tests for biodegradable and compostable materials. The present invention is not necessarily limited to materials that are classified as degradable using one or more of these tests. It is desirable that the degradable material has sufficient balanced degradability characteristics such that it degrades under normal environmental conditions rapidly enough to dissipate in the environment, yet slowly enough that it will not degrade during normal shelf life, storage or shipment time periods, and during installation.

It is an object of this invention to use a specially shaped device constructed wholly or partly from degradable materials, such as degradable polymers, to improve the service life of granular media used for treating contaminated stormwater. The improved service life is achieved by using the device to increase the area available to pass the stormwater flow. It is also an object of this invention to provide some treatment of stormwater runoff by removing pollutants and particles, to increase volume capture of the runoff, and to increase microbial activity in the media.

SUMMARY

Presented is a device and method for prolonging the service life of stormwater management practices by increasing the area available to pass flow. The increased area for flow is created using a specially shaped device that increases the area of granular media surface that is exposed to the flow. The specially shaped device is wholly or partly constructed from a degradable material such as a degradable polymer. The primary advantage of this method over the prior art is a substantial increase in the area available for flow that is provided by the device, resulting in a reduced rate of clogging of the media and increase in service life.

DRAWINGS

FIG. 1-A Shows a side view of a configuration of the specially shaped device comprising of candle elements held together by an open frame.

FIG. 1-B Shows a plan view of the configuration of the specially shaped device comprising of candle elements held together by an open frame.

FIG. 2-A Shows a side view of an alternative configuration of the specially shaped device comprising of hollow elements adjacent to each other.

FIG. 2-B Shows a plan view of the alternative configuration of the specially shaped device comprising of hollow elements adjacent to each other.

FIG. 3 Shows a view of an alternative configuration of the specially shaped device comprising of concentric elements.

FIG. 4-A Shows use of the specially shaped device for the creation of the high surface area media in an open bed.

FIG. 4-B Shows use of the high surface area media created by the specially shaped device in an open bed.

FIG. 6 Shows use of the high surface area media created by the specially shaped device in a cartridge filter operating in upflow mode.

DETAILED DESCRIPTION

Figure 3:
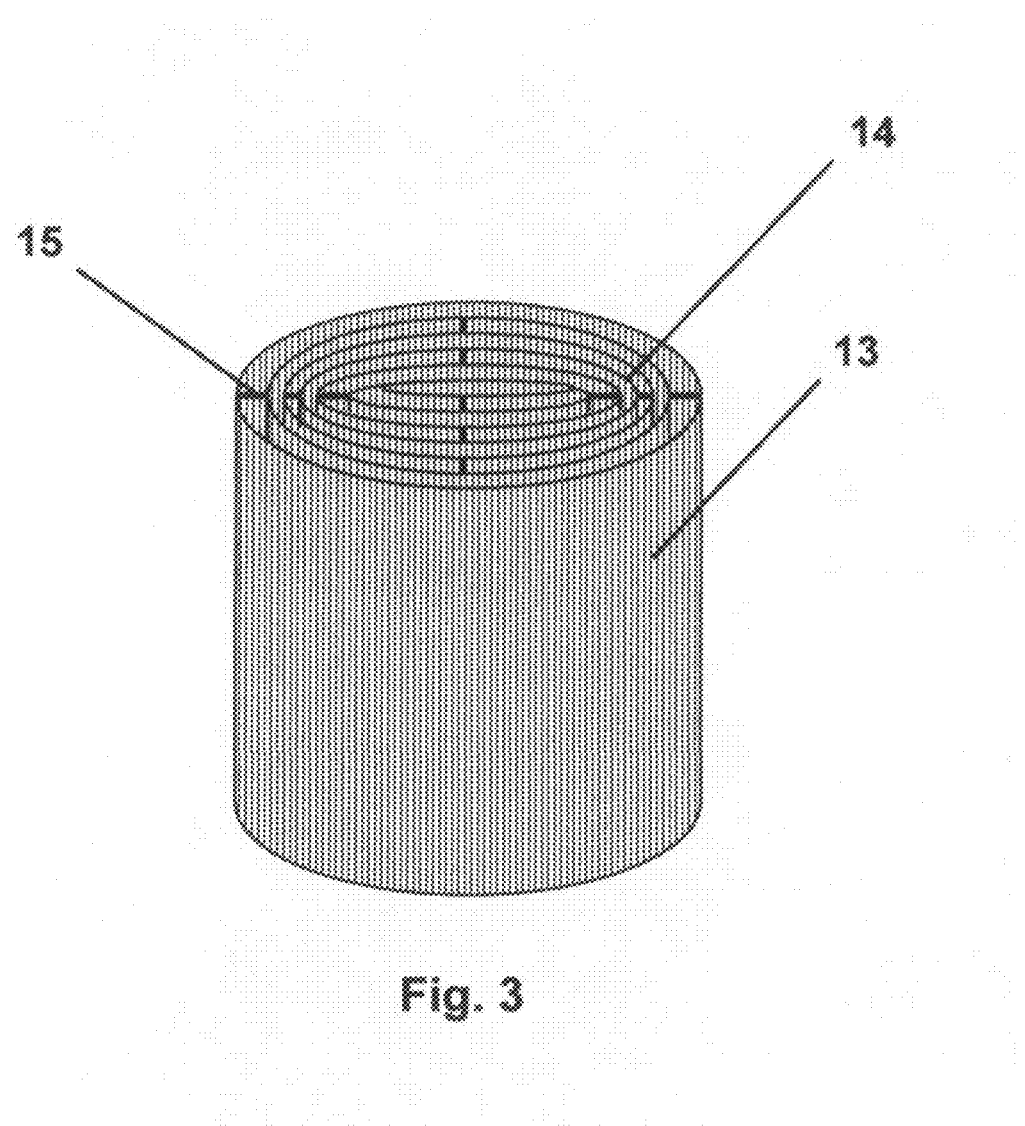

The specially shaped device of this invention comprises of one or more elements such as "candles" (cylindrical, prism, spherical, or other shape), elongated "fins" (rectangular or other cross-section), or any combination of these. Those skilled in the art will understand that the elements of the device can be any of a large variety of shapes and sizes. The elements are attached to each other by one or more support members that can be rigid (any material) or flexible (ropes or ties made from nylon or other material). The support members can form a frame that is open so that during installation a media can be introduced into predetermined areas formed by the frame. The term "open" is used here to mean completely or sufficiently open to allow media to be added so that there is contact between the media and the outside of the elements. The elements themselves are hollow so that another media can be added into the elements. The term "hollow" is used here to mean completely or sufficiently hollow to allow media to be added inside the elements so that there is contact between the media and the inside of the elements.

It will be understood by those skilled in the art that the elements of the device can be configured in any number of different ways. These include, but are not limited to, elements that are adjacent to each other, elements that are nonconcentric, elements that are concentric, elements that have nonconcentric elements within, or some alternative configuration. An alternative configuration is one where the elements are adjacent to and attached to each other and the elements themselves provide the "open frame" for the device. In this configuration, media can be introduced into adjacent elements and/or the relatively smaller remaining spaces between the elements. For example, a first media could be added into predetermined elements and a second media into other predetermined elements that are adjacent to elements and/or areas between elements that already have the first media. It will be understood by those skilled in the art that this alternative can enable a relatively denser packing of the elements, and therefore provide a relatively greater area available for flow per unit footprint area of the device than the alternative with frame members. Another alternative configuration is a device with one or more nonconcentric elements. In this configuration, the increased area available for flow (i.e. high surface area) is provided by pouring one media into the elements and another media around the outside of the elements. Another example is a main hollow cylindrical element that has secondary concentric cylindrical elements within. In this configuration, the high surface area is provided by pouring one media between alternate annular spaces and passing the contaminated water flow through the remaining annular paces that contain a second media. This configuration is expected to be particularly beneficial in cartridge-type treatment units.

The size of the elements and number of elements per unit area of device will depend on the severity of the clogging problem. Preferably, the width of the elements (or diameter for cylindrical elements) is in the range of about 1 to 10 inches, or more preferably in the range of about 2 to 6 inches, or even more preferably in the range of about 2 to 4 inches. The overall surface or contact area of the elements can vary depending on the application. Preferably, the inside surface area of an element is in the range about 2 to 20 times the footprint area occupied by the element, or more preferably in the range about 5 to 20 times the footprint area occupied by the element. If the need to prevent premature clogging is more important, than a device with elements of relatively higher surface area can be used, while a device with elements of surface area closer to about two times their footprint area may be preferred for ease of installation. To facilitate easier installation, the device can also be modular with sections that can be placed or snapped together, or attached by flexible supports and rolled out over the media.

The device can be of material that is solid, perforated, or a combination of the two. For example, the elements and frame of the device can be solid, or the frame can be solid but the elements are perforated. An advantage of solid material is increased rigidity during installation. Another advantage is intermixing of media is avoided during installation since there are no perforations through which media particles can mix. Perforated material is material that is not solid, for example it contains perforations or slots. Use of perforated material can reduce the amount of material required for constructing the device, increase the rate of degradation of the elements since relatively less material is required to be degraded, and can also be beneficial when the degradation of the elements is expected to occur relatively slow. The elements of the device can also be corrugated for increased strength. An example is a device made of corrugated, biodegradable plastic elements. Another example is a device with elements made of corrugated wood pulp material, such as corrugated fiberboard, corrugated cardboard, or corrugated paperboard. The device can also have predetermined areas covered with degradable material. This may be desirable because it allows media to be added on top of the degradable cover during installation, and the media is then allowed to fall into the predetermined areas either during installation (e.g., by manually inducing degradation) or after installation (e.g., by degradation processes present after installation). It will be understood by those skilled in the art that the degradable cover could be made of material that degrades relatively faster or can be manually degraded relatively faster than material used for the elements themselves.

The elements of the device are made of degradable material. The term "degradable material" is used here to represent material for which the time span for degradation is substantially shorter than that for conventional materials. The degradable materials used for the device can be natural, synthetic, or any combination of the two, and the materials can degrade by any number of processes, including, but not limited to, biodegradation, photodegradation, hydrolytic degradation, thermal degradation, oxidative degradation, mechanical degradation, or any combination of these. The actual time to achieve degradation will vary depending on the degradable materials used, the dimensions of the device, and the environmental conditions, but is expected to within a few years following installation of the device. The frame of the specially shaped device can be made of any material, such as degradable material or conventional material. Use of conventional frame material can provide increased strength and durability that may be required when the device is used, for example, adjacent to roadways and there is a need for reinforcement to withstand traffic loads.

The degradable material is typically selected so that the desired degradation is achieved well before expected failure of the granular media due to clogging. For example, it may be desirable to achieve degradation in about a few days or weeks when the device is used in situations where loading rates are relatively high and media clogging is expected to occur within about a month or few months. Alternatively, degradation after about a year or two may be sufficient for situations where the loading rates are relatively low and media clogging is not expected to occur for many years. A preferred degradable material for the present invention is capable of being in the range about 50 to 100 percent, or more preferably in the range about 80 to 100 percent, or even more preferably in the range about 90 to 100 percent, degraded after installation of the device. As used herein, the terms "about 50 percent", "about 80 percent", or "about 100 percent" mean that, after installation, about 60 percent, or about 80 percent, or about 100 percent of the material can be degraded essentially to basic chemical units such as monomers or small oligomers, or into small fragments. Preferably, the degradable material used in the present invention is in the range about 50 to 100 percent, or more preferably in the range about 80 to 100 percent, or even more preferably in the range about 90 to 100 percent, degraded within about a few years after installation, more preferably within about one year after installation, and even more preferably within about a few months after installation of the device. If desired, even more rapid degradation, for example during installation or within about a few hours, days, or weeks following installation of the device, can be induced by manual means. An example of manually inducing the degradation is when water is added to facilitate the degradation of a device or elements made of material that can be degraded hydrolytically. Another example of manually inducing degradation is when water, light, or heat is provided to degrade a cover made of degradable material that is used during installation to cover predetermined areas.

The specially shaped device is used with two or more granular media. The granular media used can be natural media, manufactured media, or a combination of the two. The first media is typically the media for which the increased area for flow is desired. As well as provide some treatment of the contaminated water, the second media occupies predetermined areas of the device such as inside the elements of the device or the spaces around the elements, and prevents the newly created high area surfaces from collapsing when the elements of the device degrade. The second media is selected such that clogging occurs at the interface of the two media. Typically, the second media is coarser than the first media, or of different size distribution, composition, or shape that would cause the clogging to occur at the interface of the media. The first and second media can be different based on differences in grain size or grain size distribution, grain shape, media composition, or any combination of these. For example, the first media can be soil and the second media can be relatively coarser bioretention soil (engineered soil). Another example is fine sand as the first media and relatively coarser sand as the second media. Yet another example is a manufactured media such as perlite or expanded shale as the first media and sand as the second media. It will be understood by those skilled in the art that there are a large number of media and media mixes that could be used as either the first media or the second media. Media that can be used include, but are not limited to, sand, gravel, soil, engineered soil, perlite, limestone, dolomite, activated carbon, activated alumina, iron oxide, coated sand, compost, expanded shale, expanded slate, and peat.

FIGS. 1-A and 1-B show side and plan views of a device configuration comprising of nonconcentric elements. In the configuration shown, the device 7 comprises of hollow candle elements 8 held together by open frame 9. The elements 8 are made of degradable material, such as a degradable polymer or polymer composite, so that the desired increase in contact area between the media is provided when the element material degrades. Frame 9 can be degradable material or conventional material.

FIGS. 2-A and 2-B show side and plan views of a device configuration comprising of elements adjacent to each other. The device 10 shown in FIGS. 2-A and 2-B comprises of hollow elements 11 that are adjacent to each other, with the elements themselves forming the "open frame" 12. The elements 11 are made of degradable material, such as a degradable polymer or polymer composite, so that the desired increase in contact area between the media is provided when the element material degrades.

FIG. 3 shows a typical concentric configuration of the device. In this configuration, device 13 comprises of hollow elements 14 that are concentric to each other and are attached by an open frame 15 that allows media to be poured between adjacent elements. The elements 14 are made of degradable material, such as a degradable polymer or polymer composite, so that the desired increase in contact area between the media is provided when the element material degrades. Frame 15 can be made of degradable material or conventional material.

In the preferred embodiment, a modular device made of rigid, degradable material is used to increase the media area available to pass flow. Two different media are used in this embodiment. The first media is the media for which the increased area for flow is desired. The second media is coarser than the first media, or of more uniform size distribution, or of composition or shape that would cause clogging to occur at the interface of the two media. The two media can be different based on differences in grain size or grain size distribution, grain shape, media composition, or any combination of these. Those skilled in the art will understand that there are a large number of alternative media combinations that could be used. Following addition of the media, the elements of the device are allowed to degrade to bring into contact the two media and increase the area available for flow area. The term "allowed", and similar term "allowing" used elsewhere, is used to mean that the elements are allowed to degrade through processes that result from the environment they are placed in, and includes processes that are induced manually. An example of manually inducing the degradation is when water is added to facilitate the degradation of elements made of material that can be degraded hydrolytically.

FIG. 4-A shows the preferred embodiment in which the device is used to create the desired increase in flow area in an open media bed. In FIG. 4-A, the device 10 is placed on top of the first media 16. The first media 16 is added into predetermined areas 12. During this stage the openings to the tops of adjacent predetermined areas 11 are typically closed, for example by a cover that is made of either conventional or degradable material. Closing the tops of predetermined areas 11 allows the rapid and efficient introduction of the first media 16 by preventing the media from entering areas that are for the second media. This step is especially beneficial when a relatively large number of elements are present. The second media 17 is then added to predetermined areas 11. The term "to" is used here to mean into the predetermined areas, typically after removal of any cover that may be present, or "on top" of the predetermined areas when a degradable cover is present. When a degradable cover is present, degradation of the cover will allow the media to drop into the underlying areas. Although not required to be, the first media 16 can be completely covered by a layer of second media 17 which then acts as a pretreatment media that provides some treatment of flows before they enter the first media 16. The layer of second media 17 also prevents access to mosquitoes when standing water is present in the high surface area regions 19 shown in FIG. 4-B. Following installation of the device, the elements are allowed to degrade (i.e. allowing them to degrade in the environment in which they are placed and/or allowing them to degrade by facilitating the degradation through manual means) to bring into contact the first and second media and increase the area available for flow material. FIG. 4-B shows use of the high surface area media created by the preferred embodiment after installation and degradation of device 10. The degradation of device 10 can occur when it is exposed to the environment or it can be induced (e.g. hydrolytically by introducing water, thermally by heating, or other means appropriate to the type of degradable material used). In FIG. 4-B, contaminated water enters the second media 17, and passes into first media 16 at the interface between the media, including the interface 18 between the two media in high surface regions 19. It then travels through the bulk of first media 16.

Figure 5:
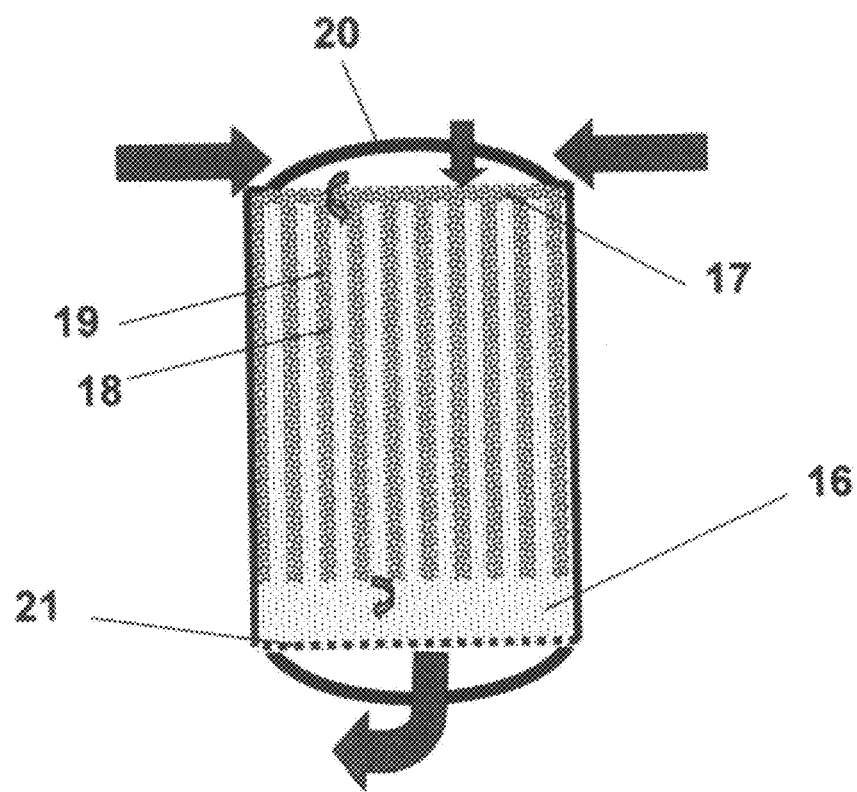
FIG. 5 Shows use of the high surface area media created by the specially shaped device in a cartridge filter operating in downflow mode.

FIG. 5 shows use of the high surface area media created by a concentric configuration of the device in a cylindrical cartridge-type treatment unit operating in downflow mode. The high surface area shown for first media 16 is created using the process outlined in FIGS. 4-A and 4-B but instead using device 13 in FIG. 3 and adding media into alternate annular spaces created by the concentric elements. In FIG. 5, device 13 has degraded following installation and is not shown. Flows enter the treatment unit 20 near the top. Flows may enter second media 17 before first media 16 if second media 17 completely covers first media 16. The flows pass into first media 16 at the interface between the media, including the interface 18 between the two media in high surface regions 19. Treated flows leave treatment unit 20 through media support 21.

FIG. 6 shows use of the high surface area media created by a concentric configuration of the device in a cylindrical cartridge-type treatment unit operating in upflow mode. The high surface area shown for first media 16 is created using the process outlined in FIGS. 4-A and 4-B but using device 13 in FIG. 3 and adding media into alternate annular spaces created by the concentric elements. In this mode, treatment unit 20 is typically turned upside down to facilitate installation of the media and device 13. In FIG. 6, device 13 has degraded following installation and is not shown. Flows enter the treatment unit 20 near the bottom, and enter second media 17 through media support 21. Flows may enter both first media 16 and second media 17 when a layer of second media 17 is not used on support 21. Flows pass into first media 16 at the interface between the media, including the interface 18 between the two media in high surface regions 19. Treated flows leave treatment unit 20 near the top.

Those skilled in the art will understand that the specially shaped device could be configured in a number of alternative ways and be used in a number of different situations. In one alternative, the hollow elements are filled with media before the areas around the elements are filled. To facilitate efficient installation in this case, the areas around the elements may be covered (e.g., with a conventional or degradable cover) during pouring of the media into the elements. In another alternative, the device is constructed with degradable material covering predetermined areas or, alternatively, these areas are covered with a degradable material prior to installation. In this alternative, the degradable cover is not required to be removed after installation of the first media, but instead degrades or can be manually degraded to allow the overlying media to fall into the openings. Another alternative utilizes a device with the elements adjacent and attached to each other. In this alternative, the elements themselves form an "open frame". In this configuration, a first media could be added into predetermined elements and a second media into other predetermined elements that are adjacent to elements that already have the first media. Another alternative utilizes flexible support members for the open frame to reduce the required storage space for the device and enable the device to be "rolled out" over the media. In yet another alternative, only the elements themselves are made of degradable material, and the frame is made of conventional durable, high strength material. In this alternative, the frame of the device can provide reinforcement to the surface of the media to enable it to withstand traffic loads.

From the description above, a number of advantages of this new invention become evident:
(a) The method involves use of a device that increases the area available for passing contaminated water through a granular media. This reduces the rate of clogging and the need for frequent maintenance, and directly reduces operating costs.
(b) The method involves use of a device that can be modular, and therefore easily installed in stormwater treatment practices such as infiltration systems and media filters.
(c) The method involves use of device that can be manufactured from readily available materials, such as biodegradable polymers. Materials that both degrade relatively quickly and do not harm the environment can be used with the method.
(d) The improved service life provided by the method over traditional media increases flexibility in the design of stormwater practices. Stormwater treatment practices could be made smaller and operated at higher loading rates because the method is less prone to clogging. This is especially beneficial in urban areas, where space for installation of stormwater practices is often constrained.
(e) The high surface area regions created by the invention will increase the volume capture of stormwater since each such region acts as a micro "infiltration basin" capable of capturing and holding the water. This is particularly beneficial during relatively higher precipitation storm events when runoff would otherwise sheet flow over the-stormwater practice. The high surface area regions will also increase microbial activity because of the relatively longer periods of water availability and due to the process of degradation of the elements.
(f) The method involves use of a device that, in one alternative, provides reinforcement for withstanding traffic loads for installations adjacent to roadways. This is achieved by use of conventional high strength materials for the frame of the device.

Although the description above contains specificities, these are not to be seen as limiting the scope of the invention but as merely providing illustrations of some of the expected common alternatives and embodiments. Thus, the scope of the invention should be determined by the appended claims and their legal equivalents, rather than by the examples given.

The invention claimed is:

1. A method for forming a granular media for passing contaminated stormwater, said method comprising: providing a device which comprises of one or more hollow elements that are made of degradable material and are of predetermined size and shape, adding a first media to first predetermined areas of said device, adding a second media to second predetermined areas of said device, and allowing said one or more hollow elements to degrade to bring about an increase in area available to pass said contaminated stormwater.

2. The method of claim 1, wherein said one or more hollow elements are attached to one or more support members that form an open frame that allows media to be added around the outside of said one or more hollow elements.

3. The method of claim 1, wherein said degradable material is selected from the group consisting of biodegradable polymers, photodegradable polymers, hydrolytically degradable polymers, thermally degradable polymers, oxidatively degradable polymers, mechanically degradable polymers, biodegradable polymer composites, photodegradable polymer composites, hydrolytically degradable polymer composites, thermally degradable polymer composites, oxidatively degradable polymer composites, mechanically degradable polymer composites, and combinations thereof.

4. The method of claim 1, wherein the step of allowing said one or more hollow elements to degrade is accomplished by manually inducing degradation.

5. The method of claim 1, wherein said one or more hollow elements are arranged to be nonconcentric, concentric, or a combination of the two.

6. The method of claim 1, wherein the inside surface area of said one or more hollow elements is at least two times the footprint area of said one or more hollow elements.

7. The method of claim 1, wherein predetermined areas of said device are covered with degradable material.

8. A method for forming a granular media for passing contaminated stormwater, said method comprising: providing a device which comprises of one or more hollow elements that are made of biodegradable material and are of predetermined size and shape, adding a first media to first predetermined areas of said device, adding a second media to second predetermined areas of said device, and allowing said one or more hollow elements to degrade to bring about an increase in area available to pass said contaminated stormwater.

9. The method of claim 8, wherein said one or more hollow elements are attached to one or more support members that form an open frame that allows media to be added around the outside of said one or more hollow elements.

10. The method of claim 8, wherein said biodegradable material is selected from the group consisting of biodegradable polymers and biodegradable polymer composites, and combinations thereof.

11. The method of claim 8, wherein the step of allowing said one or more hollow elements to degrade is accomplished by manually inducing degradation.

12. The method of claim 8, wherein said one or more hollow elements are arranged to be nonconcentric, concentric, or a combination of the two.

13. A method for forming a granular media for passing contaminated stormwater, said method comprising: providing a device which comprises of one or more hollow elements that are made of biodegradable material and are of predetermined size and shape, said one or more hollow elements having inside surface area at least two times the footprint area of said one or more hollow elements, adding a first media to first predetermined areas of said device, adding a second media to second predetermined areas of said device, and allowing said one or more hollow elements to degrade to bring about an increase in area available to pass said contaminated stormwater.

14. The method of claim 13, wherein said one or more hollow elements are attached to one or more support members that form an open frame that allows media to be added around the outside of said one or more hollow elements.

15. The method of claim 13, wherein said biodegradable material is selected from the group consisting of biodegradable polymers and biodegradable polymer composites, and combinations thereof.

16. The method of claim 13, wherein the step of allowing said one or more hollow elements to degrade is accomplished by manually inducing degradation.

17. The method of claim 13, wherein said one or more hollow elements are arranged to be nonconcentric, concentric, or a combination of the two.

\* \* \* \* \*